(12) United States Patent
Brushwood

(10) Patent No.: US 10,272,894 B2
(45) Date of Patent: Apr. 30, 2019

(54) CONTROL VALVE AND METHOD FOR OPERATING A CONTROL VALVE FOR A RAIL CAR BRAKE SYSTEM

(71) Applicant: Amsted Rail Company, Inc., Chicago, IL (US)

(72) Inventor: Daniel Brushwood, Easley, SC (US)

(73) Assignee: AMSTED RAIL COMPANY, INC., Chicago, IL (US)

( * ) Notice: Subject to any disclaimer, the term of this patent is extended or adjusted under 35 U.S.C. 154(b) by 0 days.

(21) Appl. No.: 15/452,044

(22) Filed: Mar. 7, 2017

(65) Prior Publication Data
US 2018/0257627 A1    Sep. 13, 2018

(51) Int. Cl.
B60T 15/42       (2006.01)
B60T 13/26       (2006.01)
B60T 15/02       (2006.01)
B60T 13/66       (2006.01)

(52) U.S. Cl.
CPC ............ B60T 15/42 (2013.01); B60T 13/268 (2013.01); B60T 13/665 (2013.01); B60T 15/024 (2013.01)

(58) Field of Classification Search
CPC .............................. B60T 15/024; B60T 15/42
See application file for complete search history.

(56) References Cited

U.S. PATENT DOCUMENTS

| | | | |
|---|---|---|---|
| 3,988,041 A | 10/1976 | Morris | |
| 4,850,654 A * | 7/1989 | Hart | B60T 15/42 303/33 |
| 4,875,739 A * | 10/1989 | Hart | B60T 15/42 303/33 |
| 5,924,774 A * | 7/1999 | Cook | B60T 17/228 303/115.2 |
| 6,435,623 B1 * | 8/2002 | Peitz | B60T 13/665 303/15 |
| 2002/0180264 A1 * | 12/2002 | Moffitt | B60T 13/665 303/128 |
| 2009/0102279 A1 * | 4/2009 | Thomas | B60T 8/1893 303/113.5 |
| 2009/0218880 A1 * | 9/2009 | Thomas | B60T 15/021 303/82 |

OTHER PUBLICATIONS

Amsted Rail Company, Inc.; International Patent Application No. PCT/US2018/019085; International Search Report; dated Jun. 22, 2018; (2 pages).

* cited by examiner

*Primary Examiner* — Bradley T King
(74) *Attorney, Agent, or Firm* — Dority & Manning, Inc.

(57) ABSTRACT

A control valve includes a diaphragm with a flow path with a predetermined cross-section from a brake pipe to a first side of the diaphragm and another flow path having another predetermined cross-section from a second side of the diaphragm to atmosphere. A dump valve prevents flow from the brake pipe to atmosphere. A method for operating a control valve includes supplying brake pipe air to a first side of a diaphragm through a flow path having a predetermined cross-section and permitting or preventing reference air flow to atmosphere through another flow path having another predetermined cross-section. The method further includes supplying reference air to a dump valve that prevents brake pipe air flow to atmosphere.

14 Claims, 4 Drawing Sheets

CONTROL VALVE AND METHOD FOR OPERATING A CONTROL VALVE FOR A RAIL CAR BRAKE SYSTEM

FIELD OF THE INVENTION

The present invention generally involves a control valve for a rail car brake system. In addition, the present invention may encompass a method for operating the control valve in the rail car brake system.

BACKGROUND OF THE INVENTION

Conventional trains typically rely on a pneumatic brake system to provide reliable braking. Although individual brake systems may vary slightly, they typically include a main reservoir, located on a locomotive, that supplies pressurized air through a brake pipe to each rail car connected in series to the locomotive. The brake pipe supplies the pressurized air to a combined auxiliary and emergency reservoir on each rail car. A control valve on each rail car senses pressure in the brake pipe to control actuation of the brake system on each rail car and re-charging of the combined reservoir.

For service braking, an operator slowly vents brake pipe pressure. For example, the operator may vent brake pipe pressure 6-8 pounds per square inch for minimum service reduction and 26 pounds per square inch for full service reduction. The control valve on each rail car senses the reduction in brake pipe pressure and repositions to supply a proportional air pressure from the auxiliary reservoir to a brake cylinder to actuate brake shoes on the rail car. To release the brakes, the operator charges air from the main reservoir to the brake pipe to increase brake pipe pressure. When the control valve on each rail car senses an increase in brake pipe pressure, the control valve repositions to vent air pressure from the brake cylinder to release the brake shoes. The control valve also repositions to allow brake pipe pressure to re-charge the auxiliary reservoir.

For emergency braking, the operator rapidly vents brake pipe pressure. When any control valve senses a sufficiently rapid reduction in brake pipe pressure, the control valve repositions to supply air pressure from the auxiliary and emergency reservoirs to the brake cylinder to actuate the brake shoes. In addition, the control valve repositions to vent brake pipe pressure locally to more rapidly propagate emergency braking to other rail cars in the train.

An important challenge of the brake system is to reliably ensure braking is always available while also reducing or preventing an undesired emergency (UDE) brake application. For example, fluctuations in the brake pipe pressure caused by leaks, temperature changes, flexibility in the brake pipe, length of the brake pipe, and numerous other component and environmental conditions may create a transient pressure fluctuation at an individual control valve that causes an undesired emergency brake application. Compounding this problem, control valves have been historically designed and certified to operate at a nominal brake pipe pressure of 70 pounds per square inch, but many conventional brake systems operate at a nominal brake pipe pressure of 90 pounds per square inch. The control valves may be more sensitive to pressure changes at the higher nominal operating pressure, resulting in more undesired emergency brake applications.

Therefore, the need exists for an improved control valve having enhanced stability to accurately distinguish between pressure changes caused by service braking and other non-emergency conditions from those caused by an emergency braking application. Alternately or in addition, the need exists for an improved method for operating the control valve to reliably distinguish between service braking and emergency braking.

BRIEF DESCRIPTION OF THE INVENTION

Aspects and advantages of the invention are set forth below in the following description, or may be obvious from the description, or may be learned through practice of the invention.

One embodiment of the present invention is a control valve for a rail car brake system that includes a quick action diaphragm that defines a first side in fluid communication with a brake pipe and a second side in fluid communication with a reference volume. A first flow path from the brake pipe to the first side of the quick action diaphragm has a first predetermined cross-section of less than approximately 38.5 millimeters$^2$. A second flow path from the second side of the quick action diaphragm to atmosphere has a second predetermined cross-section. A dump valve in fluid communication with the reference volume permits or prevents flow from the brake pipe, though the dump valve, to atmosphere.

In another embodiment of the present invention, a control valve for a rail car brake system includes a quick action diaphragm that defines a first side in fluid communication with a brake pipe and a second side in fluid communication with a reference volume. A first flow path from the brake pipe to the first side of the quick action diaphragm has a first predetermined cross-section. A pilot valve operably connected to the quick action diaphragm permits or prevents flow from the reference volume though the pilot valve. A second flow path from the pilot valve to atmosphere has a second predetermined cross-section with an effective diameter of more than approximately 3 millimeters. A dump valve in fluid communication with the reference volume permits or prevents flow from the brake pipe, though the dump valve, to atmosphere.

Another embodiment of the present invention is a method for operating a control valve for a rail car brake system that supplying brake pipe air to a first side of a quick action diaphragm through a first flow path having a first predetermined cross-section of less than approximately 38.5 millimeters$^2$. The method further includes supplying reference air to a second side of the quick action diaphragm and permitting or preventing reference air flow to atmosphere through a second flow path having a second predetermined cross-section. In addition, the method includes supplying reference air to a dump valve, wherein the dump valve permits or prevents brake pipe air flow through the dump valve to atmosphere.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
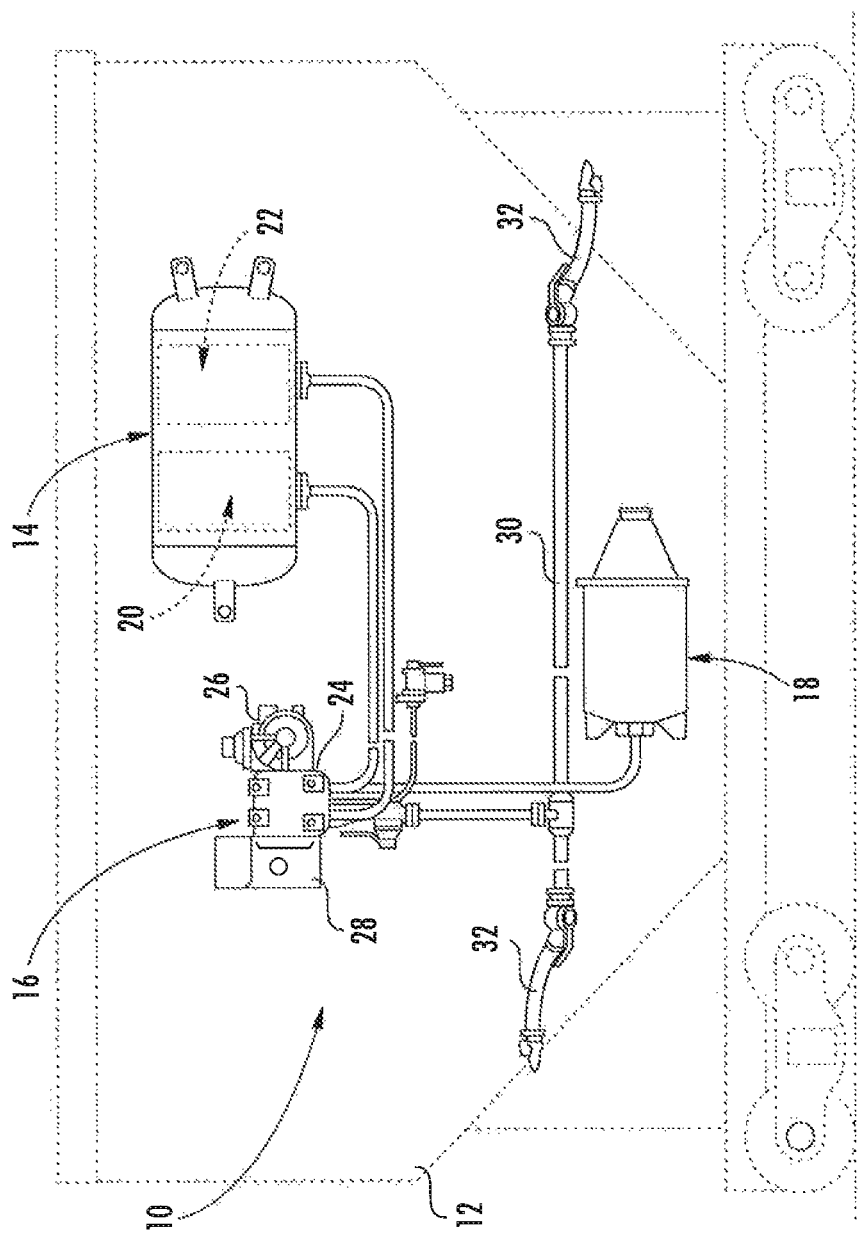
FIG. 1 is a simplified block diagram of a conventional brake system in a rail car.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. As used herein, the terms "upstream" and "downstream" refer to the relative location of components in a fluid pathway. For example, component A is upstream of component B if a fluid flows from component A to component B. Conversely, component B is downstream of component A if component B receives a fluid flow from component A. As used herein, the term "approximately" is defined to encompass a manufacturing tolerance of plus or minus 0.5 millimeters. As used herein, the term "effective diameter" is defined as the diameter of a circle that would result in a particular cross-sectional area.

FIG. 1 provides a simplified block diagram of a conventional brake system 10 in a rail car 12. As shown in FIG. 1, each rail car 12 generally includes a combined reservoir 14, a control valve 16, and a brake cylinder 18. The combined reservoir 14 generally includes an auxiliary reservoir 20 separated from an emergency reservoir 22. The control valve 16 generally includes a pipe bracket 24 that provides fluid communication between a service portion 26 and an emergency portion 28. A brake pipe 30 supplies pressurized air to the control valve 16, and hoses 32 serially connect each brake pipe 30 in each rail car 10.

The brake cylinder 18, auxiliary reservoir 20, emergency reservoir 22, and brake pipe 30 operably connect to the pipe bracket 24 to supply or receive pressurized air from the pipe bracket 24. The service portion 26 of the control valve 16 continuously monitors brake pipe 30 pressure to detect a request for service braking and direct pressurized air from the auxiliary reservoir 20 to the brake cylinder 18 to apply service braking. The emergency portion 28 of the control valve 16 compares the rate of change of brake pipe 30 pressure to detect a request for emergency braking and direct pressurized air from the auxiliary reservoir 20 and the emergency reservoir 22 to the brake cylinder 18 to apply emergency braking.

Figure 2:
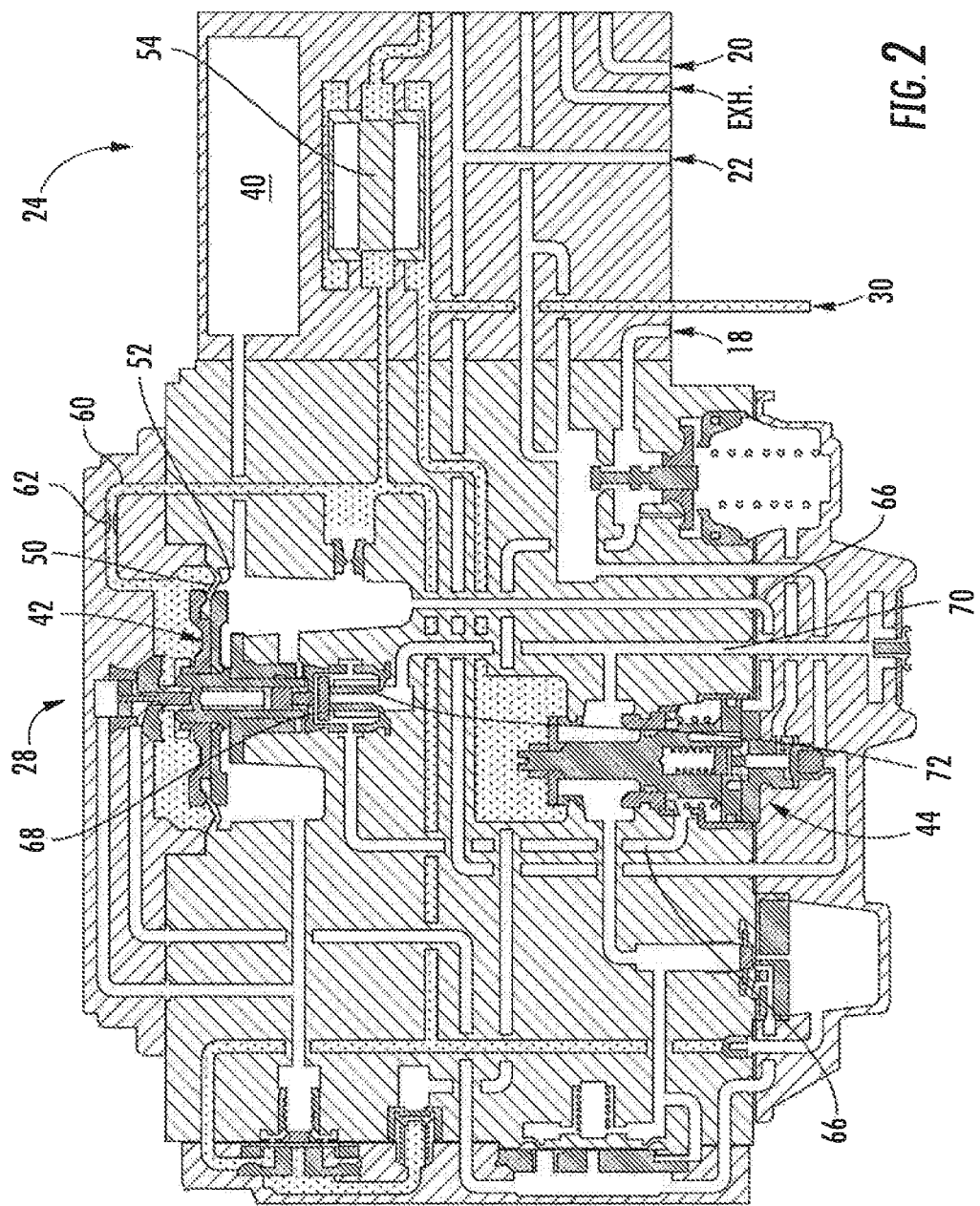
FIG. 2 is a simplified cross-section of a portion of a control valve according to one embodiment of the present invention showing specific brake pipe air flow paths during non-emergency brake application conditions.
Figure 3:
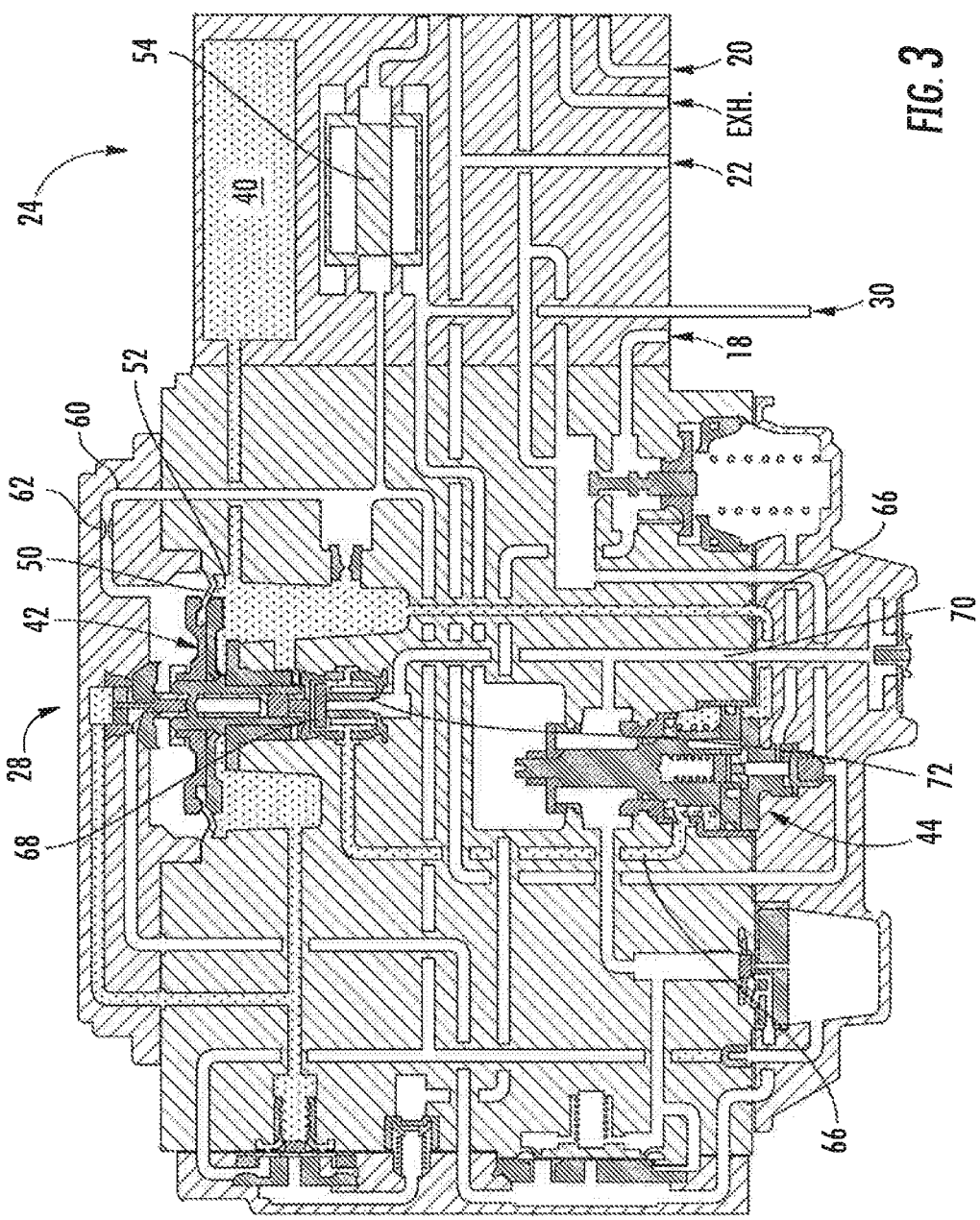
FIG. 3 is the embodiment shown in FIG. 2 showing specific reference volume air flow paths during non-emergency brake application conditions.
Figure 4:
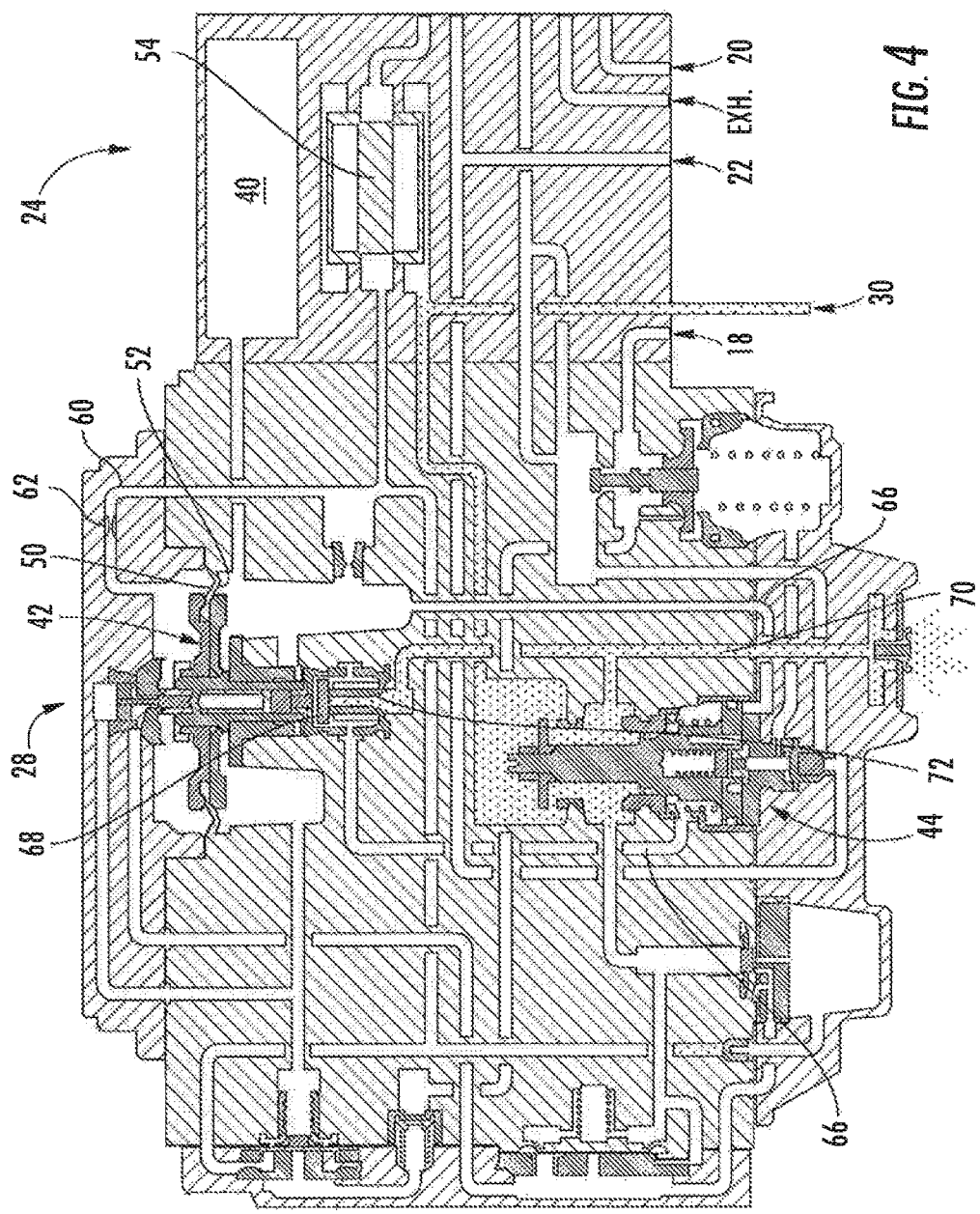
FIG. 4 is the embodiment shown in FIG. 2 showing specific brake pipe and reference volume air flow paths during emergency brake application conditions.

FIGS. 2-4 provide a simplified cross-section of the pipe bracket 24 and emergency portion 28 of the control valve 16 according to one embodiment of the present invention. As shown in FIGS. 2-4, this portion of the control valve 16 includes a reference volume 40, a quick action diaphragm 42, and a dump valve 44. The reference volume 40 may be located in the pipe bracket 24 and may receive pressurized air from any source, such as the brake pipe 30. The quick action diaphragm 42 and dump valve 44 may be located in the emergency portion 28. The quick action diaphragm 42 defines a first side 50 in fluid communication with the brake pipe 30 and a second side 52 in fluid communication with the reference volume 40.

FIG. 2 shows specific brake pipe 30 air flow paths during non-emergency brake application conditions. As shown in FIG. 2, the brake pipe 30 may supply pressurized air through a filter 54 and a flow path 60 to the first side 50 of the quick action diaphragm 42. The flow path 60 has a predetermined cross-section 62 that determines the flow rate of air through the flow path 60. The predetermined cross-section 62 is illustrated in FIG. 2-4 as being defined by an orifice or restriction in the flow path 60. However, one of ordinary skill in the art will readily appreciate that in alternate embodiments the predetermined cross-section 62 may simply be defined by the cross-sectional area of the flow path 60, a turbulator, or other device in the flow path 60 that provides a desired flow rate of air through the flow path 60 as described below. In particular embodiments, the predetermined cross-section 62 may have an effective diameter of less than approximately 7 millimeters, resulting in the predetermined cross-section 62 being less than approximately 38.5 millimeters$^2$. In other particular embodiments, the predetermined cross-section 62 may have an effective diameter of approximately 4 millimeters, resulting in the predetermined cross-section 62 being approximately 12.6 millimeters$^2$.

As also shown in FIG. 2, the brake pipe 30 may also supply pressurized air directly to the dump valve 44 without first passing through the filter 54. The dump valve 44 remains closed during non-emergency brake application conditions, as shown in FIGS. 2 and 3, to prevent venting of the brake pipe 30 through the dump valve 44 to atmosphere.

FIG. 3 shows specific reference volume 40 air flow paths during non-emergency brake application conditions. As shown in FIG. 3, the reference volume 40 is in fluid communication with the second side 52 of the quick action diaphragm 42. In addition, flow paths 66 provide fluid communication between the reference volume 40 and the dump valve 44 to allow reference volume 40 pressure to hold the dump valve 44 shut against spring pressure during non-emergency operation of the brake system 10.

FIG. 4 shows specific brake pipe 30 and reference volume 40 air flow paths during emergency brake application conditions. As shown in FIGS. 2-4, a pilot valve 68 may be operably connected to the quick action diaphragm 42. During non-emergency brake application conditions, as shown in FIGS. 2 and 3, the pilot valve 68 is shut to prevent reference volume air flow through the pilot valve 68. During emergency brake application conditions, as shown in FIG. 4, the quick action diaphragm 42 moves the pilot valve 68 upward to permit flow from the second side 52 of the quick action diaphragm 42, through the pilot valve 68, and through a flow path 70 to atmosphere. The flow path 70 has a predetermined cross-section 72 that determines the flow rate of air through the flow path 70 to atmosphere. The predetermined cross-section 72 is illustrated in FIGS. 2-4 as being defined by an orifice or restriction downstream from the pilot valve 68. However, one of ordinary skill in the art will readily appreciate that in alternate embodiments the predetermined cross-section 72 may simply be defined by the cross-sectional area of the flow path 70, a turbulator, or other device in the flow path 70 that provides a desired flow rate of air through the flow path 70 as described below. In particular embodiments, the predetermined cross-section 72 may have an effective diameter of more than approximately 3 millimeters, resulting in the pre-determined cross-section 72 being more than approximately 7.1 millimeters$^2$. In other particular embodiments, the predetermined cross-section 72 may have an effective diameter of approximately 2 millimeters, resulting in the pre-determined cross-section 72 being approximately 3.2 millimeters$^2$.

As also shown in FIG. 4, during emergency brake application conditions, the dump valve 44 has opened to permit flow from the brake pipe 30, though the dump valve 44, to atmosphere. This flow path vents brake pipe 30 pressure locally to more rapidly propagate emergency braking to other rail cars 12 in the train.

Operation of the control valve 16 shown in FIGS. 2-4 will now be described. During non-emergency brake application conditions, as shown in FIGS. 2 and 3, brake pipe 30 pressure on the first side 50 of the quick action diaphragm 42 is generally equal to the reference volume 40 pressure on the second side 52 of the quick action diaphragm 42. As a result, the pilot valve 68 remains shut, as shown in FIG. 3, to prevent reference volume 40 flow through the pilot valve 68. In addition, flow paths 66 provide fluid communication between the reference volume 40 and the dump valve 44 to allow reference volume 40 pressure to hold the dump valve 44 shut against spring pressure.

During emergency brake application conditions, an operator rapidly vents brake pipe 30 pressure causing brake pipe 30 pressure on the first side 50 of the quick action diaphragm 42 to rapidly decrease compared to the reference volume 40 pressure on the second side 52 of the quick action diaphragm 42. The predetermined cross-section 62 in the flow path 60 provides a desired flow rate of brake pipe 30 air flow in the flow path 60 to prevent spurious or undesired emergency brake applications. However, when brake pipe 30 pressure decreases fast enough, the predetermined cross-section 62 in the flow path 60 allows sufficient differential pressure to develop across the quick action diaphragm 42 to cause the quick action diaphragm 42 to move upward, opening the pilot valve 68, as shown in FIG. 4. In particular embodiments, the predetermined cross-section 62 in the flow path 60 is sized to require brake pipe 30 pressure starting at a nominal pressure of 70 pounds per square inch (70 psi) to decrease faster than 16 pounds per square inch per second (16 psi/s) before the quick action diaphragm 42 opens the pilot valve 68. In other particular embodiments, the predetermined cross-section 62 in the flow path 60 is sized to require brake pipe 30 pressure starting at a nominal pressure of 70 pounds per square inch (70 psi) to decrease faster than 18 pounds per square inch per second (18 psi/s) before the quick action diaphragm 42 opens the pilot valve 68.

When the pilot valve 68 opens, reference volume 40 air flows through the pilot valve 68 and flow path 70 to atmosphere, as shown in FIG. 4. As the reference volume 40 vents to atmosphere, the predetermined cross-section 72 in the flow path 70 provides a desired flow rate of reference volume 40 air flow in the flow path 70 to determine the rate at which the reference volume 40 pressure decreases. When reference volume 40 pressure decreases sufficiently, the reduced pressure in flow paths 66 allows spring pressure to open the dump valve 44, as shown in FIG. 4. As the dump valve 44 opens, brake pipe 30 air vents directly though the dump valve 44 to atmosphere to rapidly propagate emergency braking to other rail cars 12 in the train. As a result, the predetermined cross-sections 62, 72, individually or in combination, effectively prevent the dump valve 44 from opening unless or until brake pipe 30 pressure starting at a nominal pressure of 70 pounds per square inch (70 psi) decreases faster than 16 pounds per square inch per second (16 psi/s) or, in particular embodiments, faster than 18 pounds per square inch per second (18 psi/s).

The control valve 16 described and illustrated in FIGS. 2-4 may also provide a method for operating the control valve 16 with more stability. For example, the method may include supplying brake pipe 30 air to the first side 50 of the quick action diaphragm 42 through the flow path 60 having the first predetermined cross-section 62, as shown in FIG. 2. The method may further include supplying reference air 40 to the second side 52 of the quick action diaphragm 42 and permitting or preventing reference air 40 flow to atmosphere through the flow path 70 having the second predetermined cross-section 72, as shown in FIGS. 3 and 4. In addition, the method may include supplying reference air 40 to the dump valve 44 that permits or prevents brake pipe 30 air flow through the dump valve 44 to atmosphere. In particular embodiments, the method may prevent brake pipe 30 air flow through the dump valve 44 to atmosphere unless brake pipe 30 air pressure decreases faster than 16 pounds per square inch per second (16 psi/s).

In other particular embodiments, the method may include supplying brake pipe 30 air to the first side 50 of the quick action diaphragm 42 through the flow path 60 having an effective diameter of less than approximately 7 millimeters, resulting in the pre-determined cross-section 62 being less than approximately 38.5 millimeters$^2$. In other particular embodiments, the flow path 60 may have an effective diameter of approximately 4 millimeters, resulting in the pre-determined cross-section 62 being approximately 12.6 millimeters$^2$. Alternately or in addition, the method may include permitting or preventing reference air 40 flow through the pilot valve 68 to atmosphere through the flow path 70 having an effective diameter of more than approximately 3 millimeters, resulting in the pre-determined cross-section 72 being more than approximately 7.1 millimeters$^2$.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A control valve for a rail car brake system, comprising:
   a quick action diaphragm, wherein said quick action diaphragm defines a first side in fluid communication with a brake pipe and a second side in fluid communication with a reference volume;
   a first flow path from the brake pipe to said first side of said quick action diaphragm, wherein said first flow path has a first predetermined cross-section of less than 38.5 millimeters$^2$, wherein said first predetermined cross-section is positioned within said first flow path such that all air through said first flowpath to or from said first side of said quick action diaphragm flows through said first predetermined cross-section;

a second flow path from said second side of said quick action diaphragm to atmosphere, wherein said second flow path has a second predetermined cross-section; and a dump valve in fluid communication with the reference volume, wherein said dump valve permits or prevents flow from the brake pipe, though said dump valve, to atmosphere.

2. The control valve as in claim 1, wherein said first predetermined cross-section has an effective diameter of less than approximately 7 millimeters.

3. The control valve as in claim 1, wherein said second predetermined cross section is more than 7.1 millimeters$^2$.

4. The control valve as in claim 1, wherein said dump valve prevents flow from the brake pipe, though said dump valve, to atmosphere unless pressure in the brake pipe having a nominal operating pressure of 70 pounds per square inch (70 psi) decreases faster than 16 pounds per square inch per second (16 psi % s).

5. The control valve as in claim 1, further comprising a pilot valve operably connected to said quick action diaphragm, wherein said pilot valve permits or prevents flow from the reference volume through said second flow path.

6. The control valve as in claim 5, wherein said pilot valve prevents flow from the reference volume through said second flow path unless pressure in the brake pipe having a nominal operating pressure of 70 pounds per square inch (70 psi) decreases faster than 16 pounds per square inch per second (16 psi/s).

7. The control valve as in claim 1, wherein the first predetermined cross-section is fixedly positioned relative to the first flow path such that all air through said first flowpath flows through said first predetermined cross-section.

8. The control valve as in claim 1, wherein the dump valve is mechanically separated from the quick action diaphragm, such that the dump valve is independently actuatable from the quick action diaphragm.

9. A method for operating a control valve for a rail car brake system, comprising:

supplying brake pipe air to a first side of a quick action diaphragm through a first flow path having a first predetermined cross-section of less than 38.5 millimeters$^2$, wherein said first predetermined cross-section is positioned within said first flow path such that all air through said first flowpath to or from said first side of said quick action diaphragm flows through said first predetermined cross-section;

supplying reference air to a second side of said quick action diaphragm;

permitting or preventing reference air flow to atmosphere through a second flow path having a second predetermined cross-section; and supplying reference air to a dump valve, wherein said dump valve permits or prevents brake pipe air flow through said dump valve to atmosphere.

10. The method for operating a control valve as in claim 9, further comprising supplying brake pipe air to said first side of said quick action diaphragm through said first flow path having an effective diameter of approximately 4 millimeters.

11. The method for operating a control valve as in claim 9, further comprising preventing brake pipe air flow through said dump valve to atmosphere unless brake pipe air pressure having a nominal operating pressure of 70 pounds per square inch (70 psi) decreases faster than 16 pounds per square inch per second (16 psi/s).

12. The method for operating a control valve as in claim 9, further comprising permitting or preventing reference air flow to atmosphere through said second flow path having an effective diameter of more than approximately 3 millimeters.

13. The method for operating a control valve as in claim 9, further comprising permitting or preventing reference air flow to atmosphere through said second flow path having a cross-section of more than 7.1 millimeters$^2$.

14. The method for operating a control valve as in claim 9, further comprising preventing reference air flow to atmosphere through said second flow path unless brake pipe air pressure having a nominal operating pressure of 70 pounds per square inch (70 psi) decreases faster than 16 pounds per square inch per second (16 psi/s).

\* \* \* \* \*